(12) United States Patent
Schmidt

(10) Patent No.: US 11,040,668 B2
(45) Date of Patent: Jun. 22, 2021

(54) HITCH MOUNTED DOUBLE DECK CARGO CARRIER FOR A VEHICLE

(71) Applicant: Steven John Schmidt, Decatur, AL (US)

(72) Inventor: Steven John Schmidt, Decatur, AL (US)

(*) Notice: Subject to any disclaimer, the term of this patent is extended or adjusted under 35 U.S.C. 154(b) by 40 days.

(21) Appl. No.: 16/542,117

(22) Filed: Aug. 15, 2019

(65) Prior Publication Data

US 2021/0046882 A1 Feb. 18, 2021

(51) Int. Cl.
*B60R 9/06* (2006.01)

(52) U.S. Cl.
CPC ...................... *B60R 9/06* (2013.01)

(58) Field of Classification Search
CPC .. B60R 9/06; B60R 9/065; B60R 9/10; B60R 2011/004; B62D 63/061
See application file for complete search history.

(56) References Cited

U.S. PATENT DOCUMENTS

| | | | | |
|---|---|---|---|---|
| 4,089,554 A | * | 5/1978 | Myers | B60N 3/16 224/498 |
| 4,915,276 A | * | 4/1990 | Devito | B60R 9/06 224/500 |
| 5,524,383 A | * | 6/1996 | Sanko | A01G 9/20 217/43 A |
| 5,676,292 A | | 10/1997 | Miller | |
| 6,202,909 B1 | | 3/2001 | Belinky et al. | |
| 6,382,486 B1 | * | 5/2002 | Kretchman | B60R 9/06 224/498 |
| 6,390,343 B1 | | 5/2002 | Jain | |
| 6,669,269 B1 | * | 12/2003 | Tran-Ngoc | B60P 3/341 296/156 |
| 6,712,248 B2 | | 3/2004 | Mitchell | |
| 7,832,608 B1 | * | 11/2010 | Bauer, Jr. | B60R 9/06 224/526 |
| 8,061,571 B2 | * | 11/2011 | Aghajanian | B60R 9/06 224/499 |

(Continued)

FOREIGN PATENT DOCUMENTS

| | | |
|---|---|---|
| RU | 2696189 | 7/2019 |
| WO | 2008/125367 | 10/2008 |

OTHER PUBLICATIONS

International Search Report for PCT/US2020/044954, dated Sep. 24, 2020.

*Primary Examiner* — Brian D Nash
(74) *Attorney, Agent, or Firm* — King & Spalding LLP

(57) ABSTRACT

A cargo carrier includes a backbone that has a hitch mounting portion that is configured to be removably coupled to a trailer hitch receiver of a vehicle and a deck portion that is vertically offset from the hitch mounting portion. Further, the cargo carrier includes a pair of upright members that are coupled to the deck portion of the backbone such that the upright members are substantially parallel to and spaced apart from each other. Each upright member includes a bottom support portion and a pair of arms. Furthermore, the cargo carrier includes a lower cargo deck is coupled to the bottom support portion of the pair of upright members and an upper cargo deck is coupled to the top ends of the arms of the pair of upright members such that the upper cargo deck is spaced apart from and at least partially overlying the bottom cargo deck.

20 Claims, 9 Drawing Sheets

(56) References Cited

U.S. PATENT DOCUMENTS

| | | | | |
|---|---|---|---|---|
| 8,162,193 | B2* | 4/2012 | Gang | B60R 9/06 224/526 |
| 8,800,832 | B2* | 8/2014 | Niemi | B60R 9/06 224/545 |
| 8,820,598 | B2* | 9/2014 | Tennyson | B60R 9/065 224/509 |
| 9,114,759 | B1* | 8/2015 | Hudson | B62J 11/00 |
| 10,479,284 | B1* | 11/2019 | Salyer | B60R 9/06 |
| 2002/0074371 | A1* | 6/2002 | Adams | B60R 11/04 224/519 |
| 2005/0205630 | A1* | 9/2005 | Cooper | B60R 9/12 224/521 |
| 2005/0242141 | A1* | 11/2005 | Zhang | B60R 9/06 224/499 |
| 2006/0151556 | A1* | 7/2006 | Eby | B60R 9/06 224/519 |
| 2008/0149420 | A1* | 6/2008 | Cheatham | B60R 9/06 182/63.1 |
| 2008/0238141 | A1* | 10/2008 | Aghajanian | B60R 9/06 296/186.4 |
| 2011/0221168 | A1* | 9/2011 | Alexander | B62D 63/061 280/639 |
| 2015/0110594 | A1* | 4/2015 | Descoteaux | B60P 3/14 414/800 |
| 2016/0368427 | A1* | 12/2016 | Field, Jr. | B60R 9/06 |
| 2018/0178703 | A1* | 6/2018 | Keck | B60R 9/065 |
| 2019/0009730 | A1* | 1/2019 | Hintz | B60R 9/06 |
| 2019/0061636 | A1* | 2/2019 | Foster | B60R 9/06 |
| 2019/0375338 | A1* | 12/2019 | Deninno | B60R 9/10 |
| 2020/0023785 | A1* | 1/2020 | Descoteaux | B60R 9/065 |
| 2020/0079294 | A1* | 3/2020 | Zobel | B60R 9/065 |

* cited by examiner

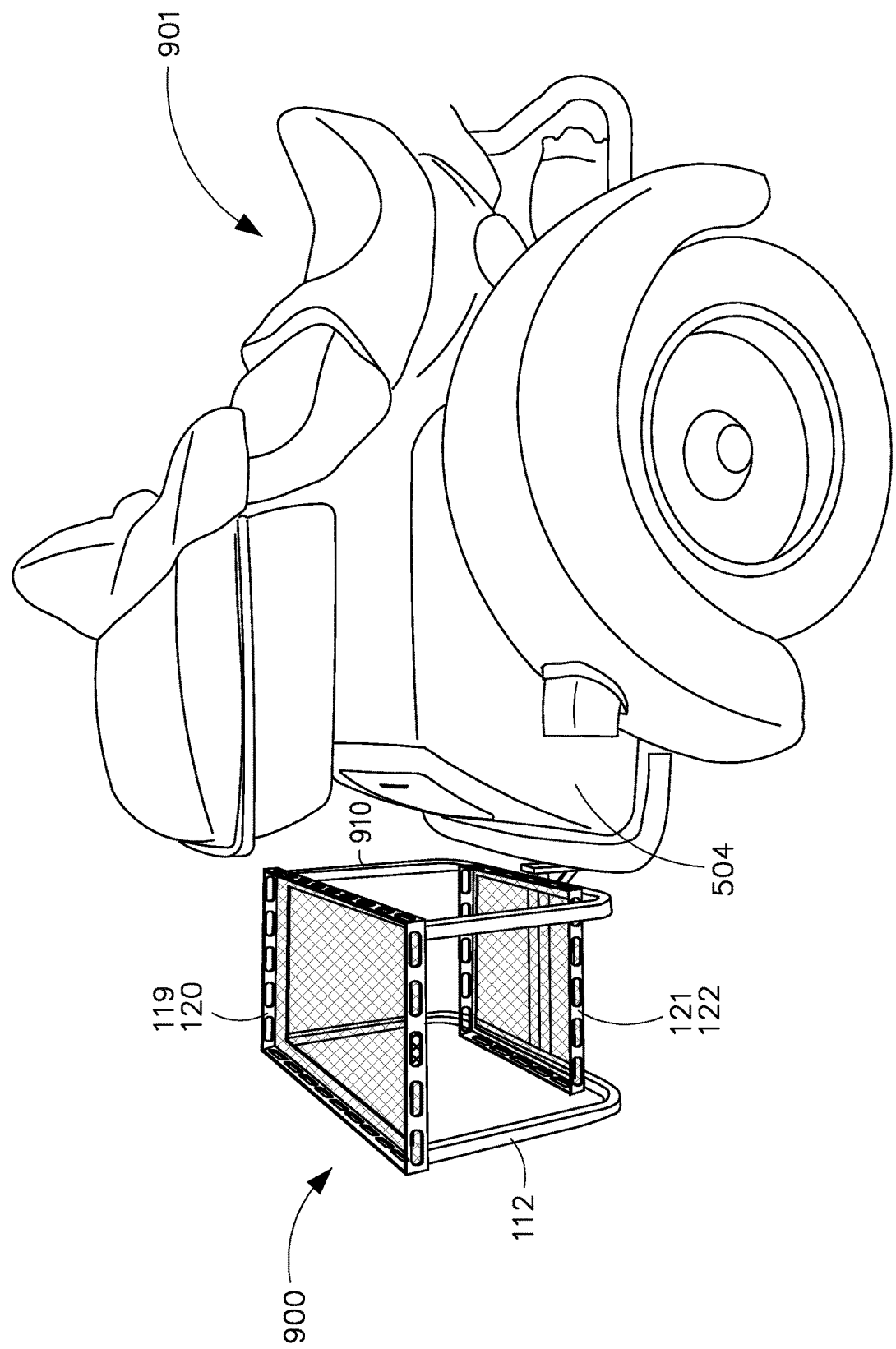

HITCH MOUNTED DOUBLE DECK CARGO CARRIER FOR A VEHICLE

TECHNICAL FIELD

Embodiments of the present disclosure relate generally to cargo carriers for vehicles, and more particularly to a hitch mounted double deck cargo carrier for vehicles.

BACKGROUND

Passenger vehicles (hereinafter 'vehicles') that are adapted to transport people provide limited cargo space to accommodate a small amount of cargo within the vehicle (e.g., trunk). To expand the cargo carrying capacity, the vehicles may need to be equipped with cargo carriers such as cargo trailers, roof top carriers, etc., that provide extra cargo space.

Roof top carriers may reduce gas mileage and may be cumbersome to access particularly in taller vehicles. Further, vehicles such as motorcycles, tricycle motorcycles, etc., may not have the option for rooftop carriers. Typically, in vehicles such as motorcycles, tricycle motorcycles, etc., a cargo trailer is attached to a trailer hitch on the vehicle to expand the cargo carrying capacity thereof. However, cargo trailers may decrease vehicle control and may substantially limit vehicle maneuverability (e.g., when backing up). Also, cargo trailers may be expensive.

A relatively cheaper alternative to the cargo trailer is a hitch mounted cargo carrier. The hitch mounted cargo carrier also attaches to a trailer hitch on the vehicle such that the hitch mounted cargo carrier is suspended above the road from a rear end of the vehicle. Since the hitch mounted cargo carrier is held behind the vehicle, it does not appreciably reduce gas mileage. Further, since the hitch mounted cargo carrier is suspended above the road without wheels, it does not appreciably limit maneuverability. Furthermore, even when backing up, the hitch mounted cargo carrier merely extends the length of the vehicle. However, one disadvantage of the hitch mounted cargo carrier is that the hitch mounted cargo carrier blocks the rear entrance of the vehicle, such as the trunk. That is, a hitch mounted cargo carrier restricts access to a cargo space that is behind the vehicle when the hitch mounted cargo carrier is attached to the vehicle. For example, when a conventional hitch mounted cargo carrier is attached to the vehicle, the door (e.g., trunk) that provides access to the cargo space at the rear end of the vehicle may be blocked by the hitch mounted cargo carrier and cannot be opened unless the whole hitch mounted cargo carrier is removed from the vehicle, i.e., disengaged from the trailer hitch of the vehicle and set aside from the vehicle. Removing the hitch mounted cargo carrier each time a user wants to access the cargo space at the rear end of the vehicle may be inconvenient, inefficient, time consuming, and cumbersome.

This background information is provided to reveal information believed to be of possible relevance to the present disclosure. No admission is necessarily intended, nor should be construed, that any of the preceding information constitutes prior art against the present disclosure.

SUMMARY

In one aspect, the present disclosure is related to a cargo carrier that is configured to be mounted to a trailer hitch receiver of a vehicle to position said cargo carrier proximate to a rear end of the vehicle. The cargo carrier includes a backbone member that comprises a hitch mounting portion and a deck portion that are vertically offset from each other. The hitch mounting portion is configured to be removably coupled to the trailer hitch receiver. Further, the cargo carrier includes an upright member assembly. Further, the upright member assembly includes a front upright member that is coupled to and disposed adjacent a first end of the deck portion of the backbone member, and a rear upright member that is coupled to and disposed adjacent a second end of the deck portion of the backbone member. Furthermore, the cargo carrier includes an upper cargo deck and a lower cargo deck that are coupled to the upright member assembly such that the upper cargo deck is spaced apart from and at least partially overlying the lower cargo deck. The upper cargo deck and the lower cargo deck define a storage cavity therebetween.

In another aspect, the present disclosure is related to a cargo carrier that is configured to be mounted to a trailer hitch receiver of a vehicle to position said cargo carrier proximate to a rear end of the vehicle. The cargo carrier includes a backbone member that comprises a first end that is configured to be removably coupled to a trailer hitch receiver of a vehicle and a second end. The first end is vertically offset from the second end. Further, the cargo carrier includes a support collar that is coupled to and disposed adjacent the first end of the backbone member to receive a portion of the trailer hitch receiver therein and strengthen the removable coupling between the backbone member and the trailer hitch receiver. Furthermore, the cargo carrier includes a first upright member and a second upright member that are coupled to and disposed adjacent a second end of the backbone member such that the first upright member is substantially parallel to and spaced apart from the second upright member. Additionally, the cargo carrier includes an upper cargo deck and a lower cargo deck that are coupled to the first upright member and the second upright member such that the upper cargo deck is spaced apart from and at least partially overlying the lower cargo deck. The upper cargo deck and the lower cargo deck define a storage cavity therebetween that is configured to at least one of store a cargo therein and receive a rear door of the vehicle therein when the rear door is opened to access a cargo storage space in the rear end of the vehicle.

These and other aspects, features, and embodiments of the disclosure will become apparent to a person of ordinary skill in the art upon consideration of the following brief description of the figures and detailed description of illustrated embodiments.

BRIEF DESCRIPTION OF THE FIGURES

The foregoing and other features and aspects of the present disclosure are best understood with reference to the following description of certain example embodiments, when read in conjunction with the accompanying drawings, wherein:

FIG. 9 illustrates a perspective view of another hitch mounted double deck cargo carrier coupled to a vehicle, in accordance with example embodiments of the present disclosure.

Figure 1:
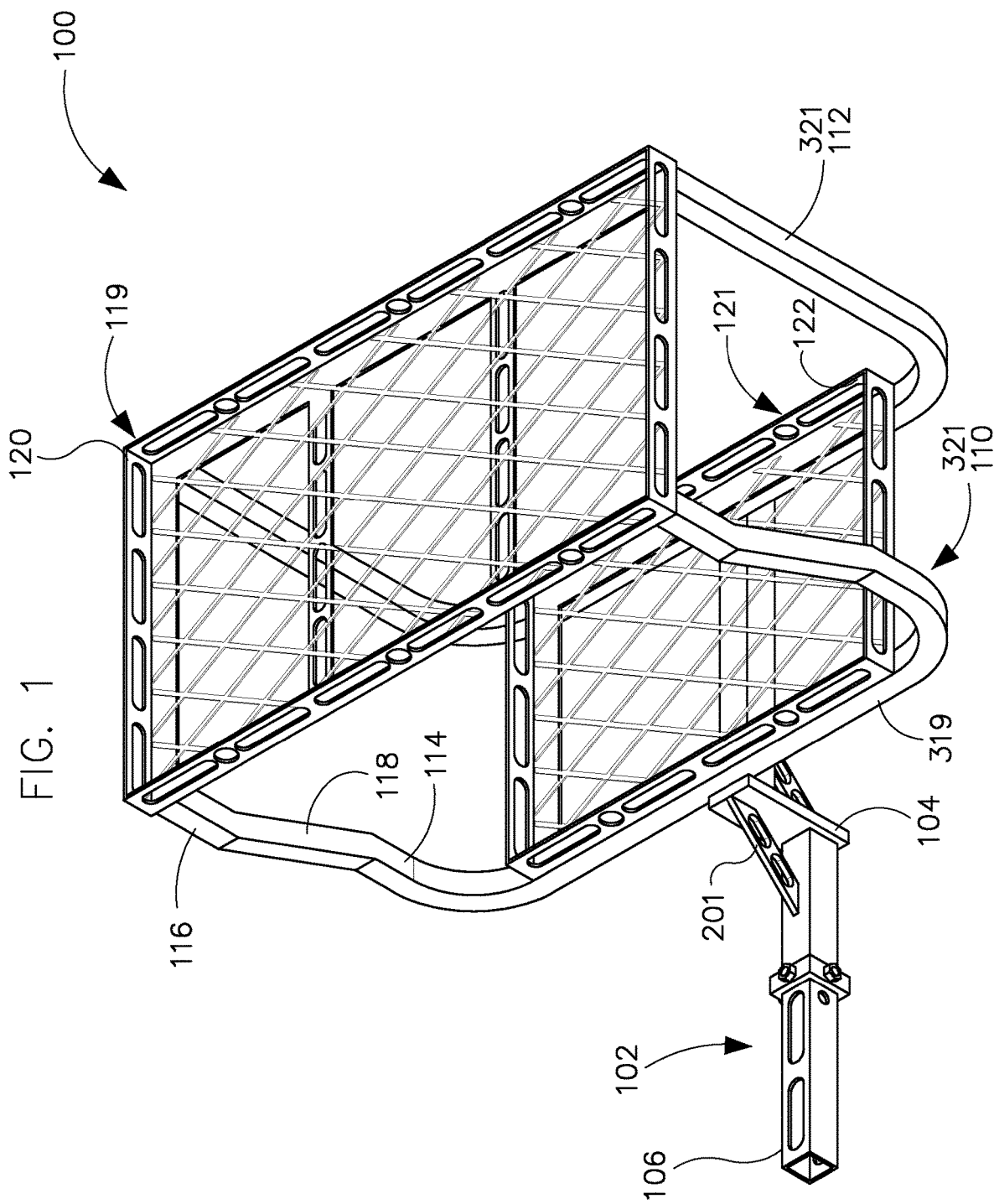
FIG. 1 illustrates a top perspective view of an example hitch mounted double deck cargo carrier, in accordance with example embodiments of the present disclosure.

The drawings illustrate only example embodiments of the present disclosure and are therefore not to be considered limiting of its scope, as the present disclosure may admit to other equally effective embodiments. The elements and features shown in the drawings are not necessarily to scale, emphasis is instead placed on clearly illustrating the principles of the example embodiments. Additionally, certain dimensions or positions may be exaggerated to help visually convey such principles.

DETAILED DESCRIPTION OF EXAMPLE EMBODIMENTS

In the following paragraphs, an example hitch mounted double deck cargo carrier (hereinafter 'cargo carrier') will be described in further detail by way of examples with reference to the attached drawings. In the description, well-known components, methods, and/or processing techniques are omitted or are briefly described so as not to obscure the disclosure. As used herein, the "present disclosure" refers to any one of the embodiments of the disclosure described herein and any equivalents. Furthermore, reference to various feature(s) of the "present disclosure" is not to suggest that all embodiments must include the referenced feature(s).

The example cargo carrier of the present disclosure includes a backbone member. The backbone member is configured to be coupled to a trailer hitch receiver tube (hereinafter 'trailer hitch receiver') at one end thereof. Further, the example cargo carrier includes upright members that are coupled to and disposed adjacent an opposite end of the backbone member. Furthermore, the example cargo carrier includes an upper cargo deck and a lower cargo deck that are supported on and coupled to the upright members.

The upper cargo deck and the lower cargo deck are configured to support cargo thereon, such as, but not limited to bags, cooler boxes, etc. The upper cargo deck is spaced apart from and overlays the lower cargo deck such that a space in between the upper cargo deck and the lower cargo deck can be used to: (a) accommodate cargo, and (b) receive the rear door (e.g., trunk door) of the vehicle when there is no cargo stored in the lower cargo deck and when the rear door is opened to access the cargo space at the rear end of the vehicle. In other words, the decks of the cargo carrier are spaced apart and the uprights are dimensioned such that the rear door of the vehicle that provides access to the cargo space at the rear end of the vehicle can be opened while the cargo carrier remains attached to the vehicle without having to remove the whole cargo carrier from the vehicle. Each of the upper deck and the lower deck may include a rectangular angle frame (e.g., L-angle frame) and a base (or floor) that is coupled to the angle frame.

Additionally, the example cargo carrier includes a support collar that is disposed on the backbone member. The support collar is configured to receive additional fasteners therethrough to secure the coupling between the backbone member of the cargo carrier and the trailer hitch receiver and limit any undue movement of the cargo carrier when attached to the vehicle via the trailer hitch receiver.

The example cargo carrier will now be described in greater detail in association with FIGS. 1-9. In particular, one example cargo carrier will be described in association with FIGS. 1-8; and another example cargo carrier will be described in association with FIG. 9.

Figure 2:
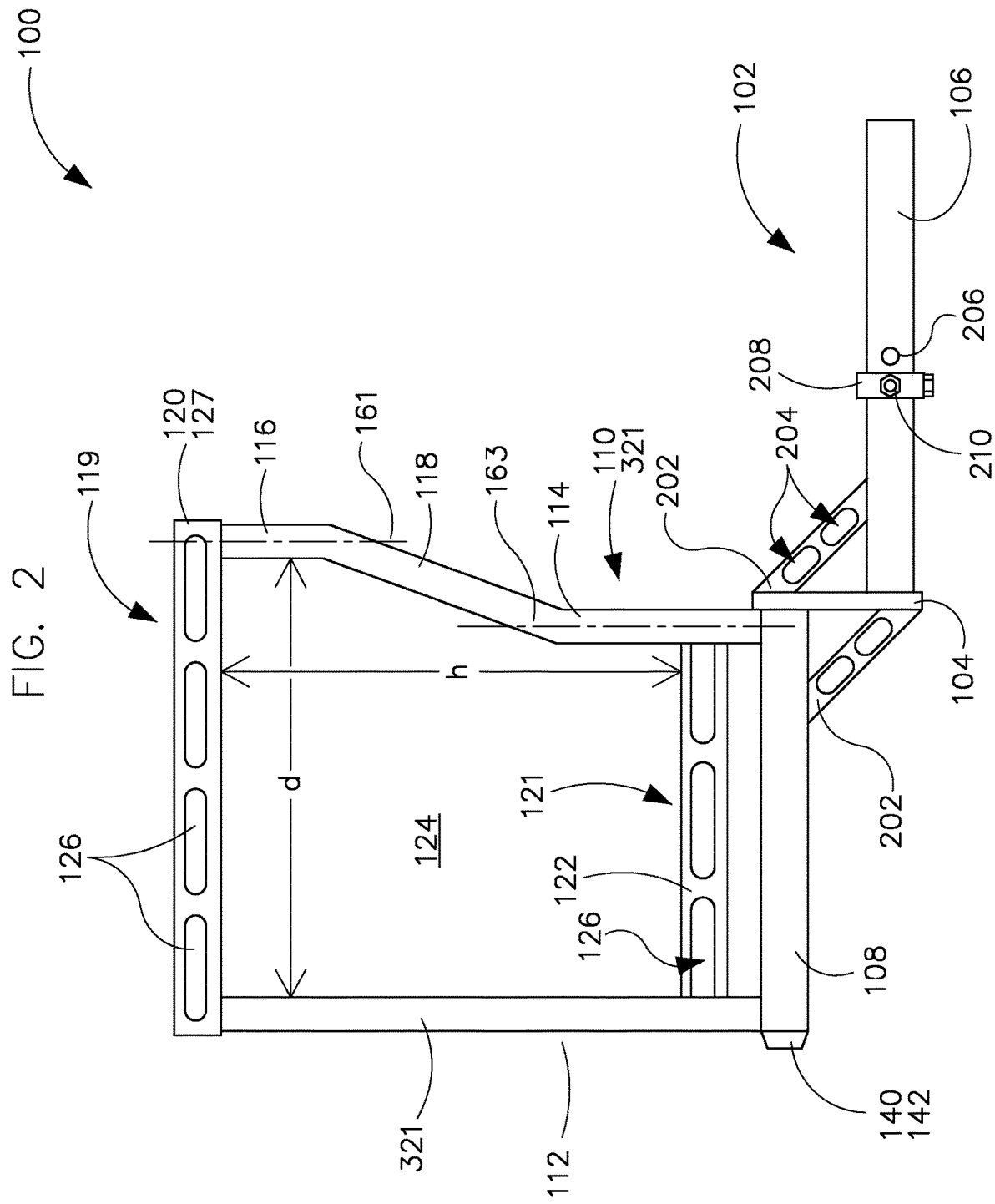
FIG. 2 illustrates a side view of the example hitch mounted double deck cargo carrier of FIG. 1, in accordance with example embodiments of the present disclosure.

Referring to FIGS. 1-8, an example cargo carrier 100 may include a backbone member 102. The backbone member 102 (hereinafter 'backbone 102') may include an intermediate portion 104, a hitch mounting portion 106 extending out in a first direction from one end of the intermediate portion 104, and a deck portion 108 extending out in a second direction from an opposite end of the intermediate portion 106. The first direction is opposite to the second direction. The intermediate portion 104 of the backbone 102 may be configured to provide a vertical offset such that the deck portion 108 of the backbone 102 is disposed higher than the hitch mounting portion 106 of the backbone 102. Further, the backbone 102 may include gusset plates 202 that are configured to connect the different portion (106, 104, and 108) of the backbone 102 and strengthen the joints therebetween to bear the load applied on the joints when the cargo carrier 100 is carrying cargo on the cargo decks (119, 121) thereof. As illustrated in FIG. 2, one gusset plate 202 is disposed between the hitch mounting portion 106 of the backbone 102 and the intermediate portion 104 of the backbone 102 to connect the hitch mounting portion 106 to the intermediate portion 104 and strengthen the joint therebetween, while another gusset plate 202 is disposed between the deck portion 108 of the backbone 102 and the intermediate portion 104 of the backbone 102 to connect the deck portion 108 to the intermediate portion 104 and strengthen the joint therebetween.

The hitch mounting portion 106 of the backbone 102 may be configured to be coupled to a trailer hitch receiver 502 (shown in FIG. 5), and the deck portion 108 may be configured to support the cargo decks (191, 121) of the cargo carrier 100. The vertical offset provided by the intermediate portion 104 of the backbone 102 may be designed to raise the cargo decks (191, 121) supported on the deck portion 108 of the backbone 102 relative to the ground for increased clearance, i.e., when the cargo carrier 100 is coupled to a vehicle 901 (shown in FIG. 9).

The vehicle 901 may include a trailer hitch receiver 502 that may be coupled to a rear end 504 of the vehicle 901, and the hitch receiving portion 106 of the backbone 102 may be configured to be inserted within a receiving cavity 503 of the trailer hitch receiver 502 to couple the cargo carrier 100 to a vehicle 901. In particular, the hitch mounting portion 106 of the backbone 102 may include a first set of coupling apertures 206 that are configured to receive a hitch pin fastener 713 (shown in FIG. 7) therethrough to couple the cargo carrier 100 to the trailer hitch receiver 502. Further, the hitch receiving portion 106 of the backbone 102 may include a support collar 208 that comprises a first set of collar apertures 210 that are configured to receive fasteners (e.g., pins, screws, etc.) therethrough to secure the coupling between the cargo carrier 100 and the trailer hitch receiver 502. In other words, the support collar 208 is configured to provide additional support and security to the coupling between the cargo carrier 100 and the trailer hitch receiver 502 to prevent any undue movement of the cargo carrier 100 when it is coupled to the vehicle 901 via the trailer hitch receiver 502. In one example embodiment, the support collar 208 may be welded to the hitch receiving portion 106 of the backbone 102. However, in other example embodiments, the support collar 208 may be coupled to the backbone 102 using any other appropriate coupling mechanism, such as by using fasteners.

Figure 4:
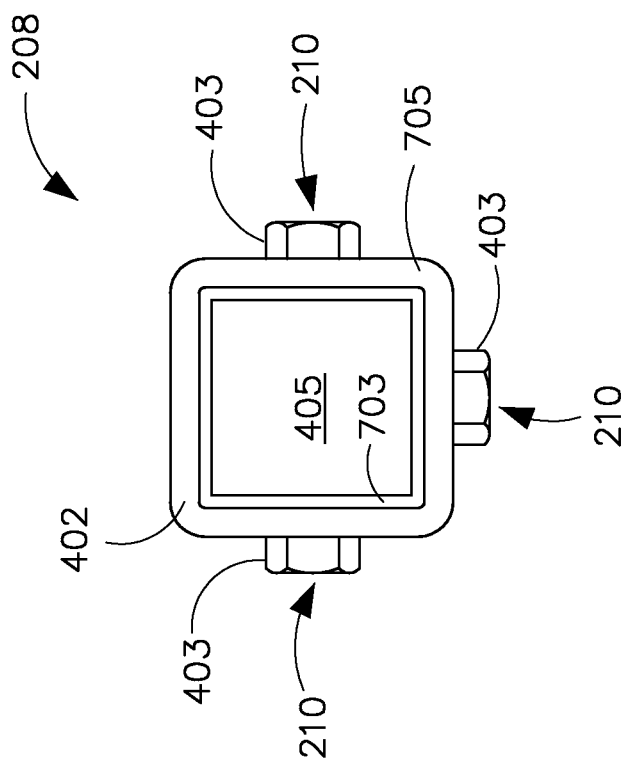
FIG. 4 illustrates a front view of an example support collar of the example hitch mounted double deck cargo carrier of FIG. 1, in accordance with example embodiments of the present disclosure.
Figure 5:
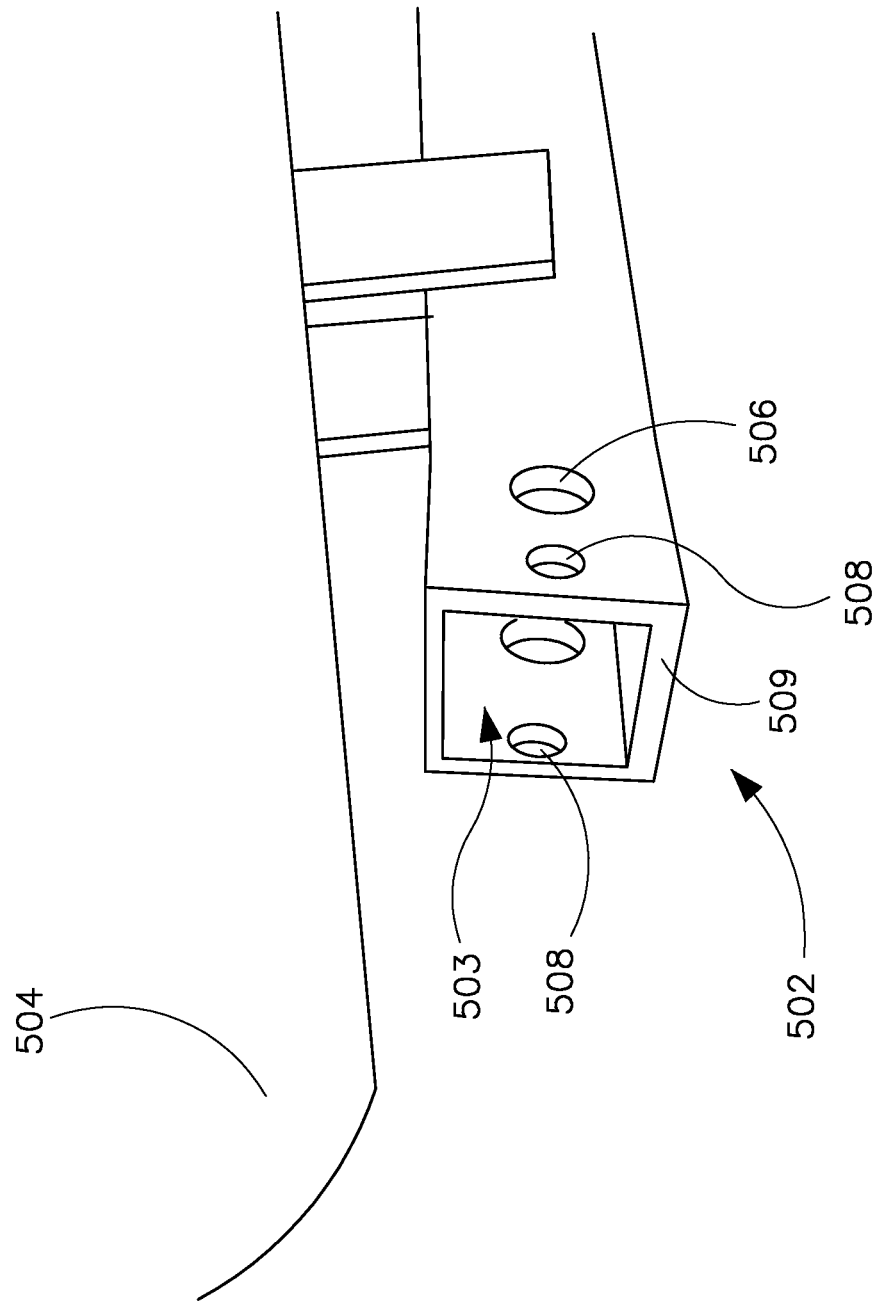
FIG. 5 illustrates a perspective view of an example trailer hitch receiver that is coupled to a vehicle, in accordance with example embodiments of the present disclosure.
Figure 7:
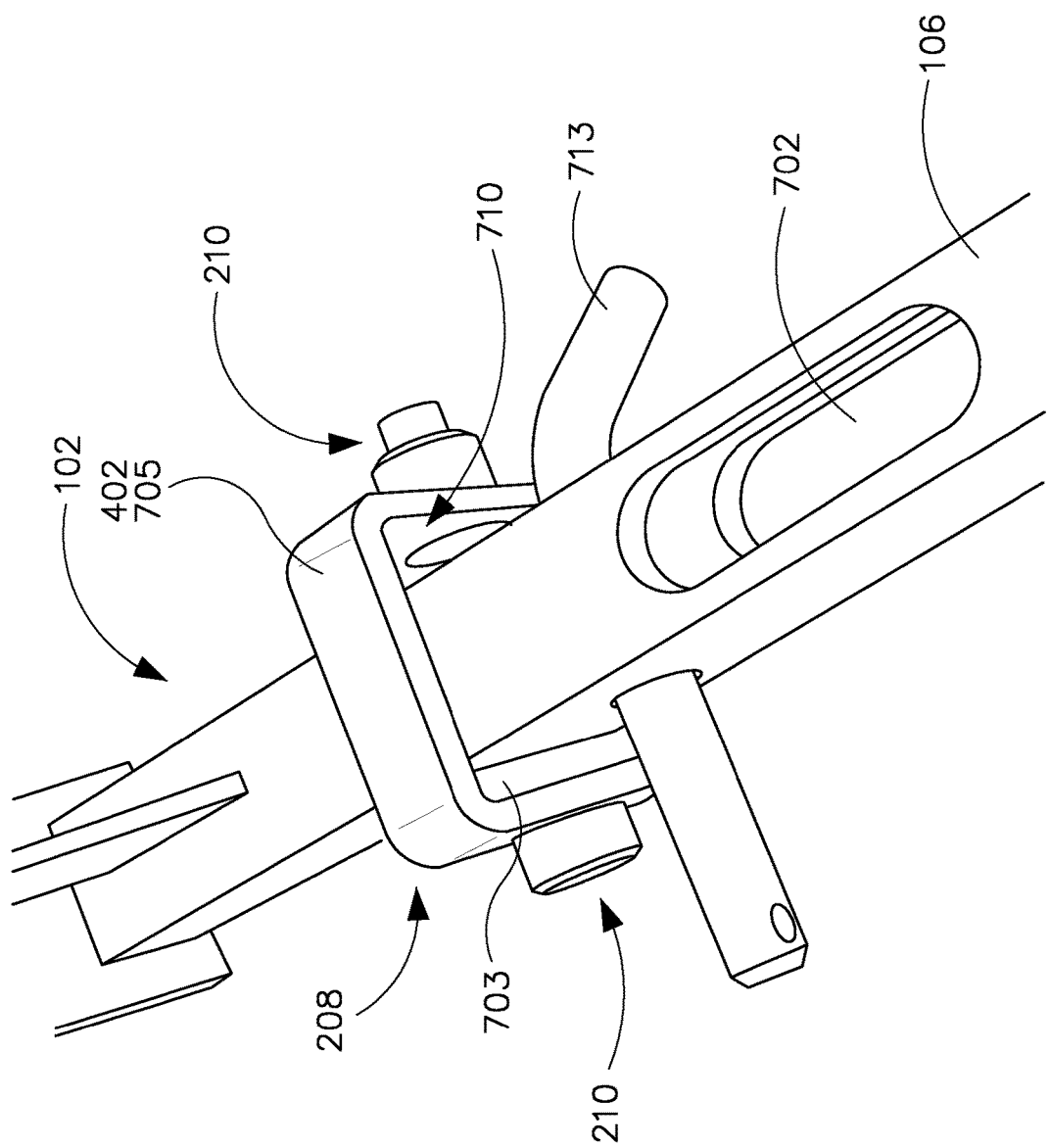
FIG. 7 illustrates an expanded view of the example support collar disposed on a backbone of the hitch mounted double deck cargo carrier of FIG. 1 with a pin disposed in the backbone, in accordance with example embodiments of the present disclosure.

As illustrated in FIGS. 4 and 7, the support collar 208 may have a body 402 that includes a base 703 and a sidewall 705 that extends substantially perpendicular to the base 702 along an outer perimeter of the base 703. The base 703 may define an opening 405 to receive the hitch mounting portion 106 of the backbone 102 therethrough. Further, the support collar 208 may include multiple boss structures 403 that extend radially from the sidewall 705 of the body 402. For example, the support collar 208 may include three boss structures 403. Each boss structure 403 may define a through collar aperture 210 that extends through the sidewall 405 and that is configured to receive fasteners therethrough to secure the coupling between the hitch mounting portion 106 of the backbone 102 and the trailer hitch receiver 502.

Similar to the hitch receiving portion 106 of the backbone 102, the trailer hitch receiver 502 may include a second set of coupling apertures 506 and a second set of collar apertures 508. The second set of collar apertures 508 may be disposed closer to the front face 509 (or front end) of the trailer hitch receiver 502 than the second set of coupling apertures 506.

In one example, to couple the cargo carrier 100 to the vehicle 901, the hitch receiving portion 106 of the backbone 102 may be inserted into the receiving cavity 503 of the trailer hitch receiver 502 till: (a) the front face 509 of the trailer hitch receiver 502 is disposed within the sidewall 705 of the support collar 208 and engages the base 703 of the support collar 208, and (b) the first set of coupling apertures 206 of the backbone 102 is axially aligned with the second set of coupling apertures 506 of the trailer hitch receiver 502. Responsive to inserting the hitch receiving portion 106 of the backbone 102 into the receiving cavity 503 of the trailer hitch receiver 502 as described above, the hitch pin fastener 713 may be passed through the axially aligned coupling apertures (206, 506) of the backbone 102 and the trailer hitch receiver 502 to couple the cargo carrier 100 to the vehicle 901. Further, to additionally secure and support the coupling between the backbone 102 of the cargo carrier 100 and the trailer hitch receiver 502 of the vehicle 901, fasteners (e.g., screws, pins, etc.,) may be passed through the collar apertures 210 of the support collar 208 such that fasteners engage the trailer hitch receiver 502. However, in other example embodiments, the cargo carrier 100 may be coupled to the trailer hitch receiver 502 using any other appropriate coupling mechanisms without departing from a broader scope of the present disclosure.

In some example embodiments, the backbone 102 may not include the support collar 208. In said some example embodiments where the backbone 102 does not include the support collar, bolts may be inserted through the second set of collar apertures 508 of the trailer hitch receiver 502 to secure the cargo carrier 100 to the trailer hitch receiver 502.

Even though the present disclosure describes the backbone 102 as comprising an intermediate portion 104 that vertically offsets the hitch mounting portion 106 and the deck portion 108, one of skill in the art can understand and appreciate that in some example embodiments, the backbone 102 may not include the intermediate portion 104, and the hitch mounting portion 106 and the deck portion 108 may not be vertically offset.

Furthermore, in some example embodiments, the intermediate portion 104 may not be substantially perpendicular to the deck portion 108 and the hitch mounting portion 106. Instead, the intermediate portion 104 may be form an obtuse or acute angle with the deck portion 108 and the hitch mounting portion 106 in such a manner that the deck portion 108 and the hitch mounting portion 106 are vertically offset. Additionally, in some example embodiments, the backbone 102 may not include the gusset plates 202.

As illustrated in FIGS. 2 and 7, the gusset plate 202 and the hitch mounting portion 106 of the backbone 102 may have lightening holes (204, 702) formed therein to reduce an overall weight of the cargo carrier 100. Even though FIGS. 2 and 7 illustrates the lightening holes (204, 702) as being formed in the gusset plate 102 and the hitch mounting portion 106 of the backbone 102, one of skill in the art can understand and appreciate that additional or fewer lightening holes may be formed in any other appropriate portion of the cargo carrier 100 without departing from a broader scope of the present disclosure. For example, the lightening holes may be formed in the uprights (110, 112) and/or cargo decks (119, 121) of the cargo carrier 100.

Further, an open end 140 of the deck portion 108 of the backbone 102 may be covered using an end cap 142. The end cap 142 may be configured to hermetically seal the open end 140 of the deck portion 108 of the backbone 102 to prevent water or other environmental elements from entering therethrough. In one or more example embodiments, the end cap 142 may be made reflective or a reflector may be attached to the end cap 142. Alternatively, lights such as LEDs (light emitting diodes) may be provided on the end cap 142. The lights and/or reflectors may be configured to provide other drivers with a visual indication of the cargo carrier 100 (e.g., at night time). The reflectors may include a reflective tape or any other appropriate reflective material that may be coupled to the end cap using adhesives or fasteners. If lights are provided, said lights may be electronically connected through a lighting harness used while towing trailers to operate the lights in conjunction with the tail lights of the vehicle 901. In some example embodiments, the electrical wiring to the lights on the end cap 142 may be routed through the backbone 102 of the cargo carrier 100. Alternatively, any other appropriate methods may be used to route the electrical wiring for the lights to the end cap 142 where the light may be disposed.

In one or more example embodiments, the backbone 102 may be a hollow metal tube that is constructed using any appropriate ferrous material such as welded steel or any appropriate non-ferrous material such as welded aluminum. In the example embodiment illustrated in FIGS. 1-8 of the present disclosure, the backbone 102 may have a square cross-section, however, in other example embodiments, the backbone 102 may have any other appropriate cross section that allows coupling with the trailer hitch receiver 502 without departing from a broader scope of the present disclosure. In one example, the backbone 102 is configured to be mounted a 1¼" trailer hitch receiver that is configured to be secured using a ½" diameter pin and retaining clip.

In addition to the backbone 102, the cargo carrier 100 may include a pair of upright members, e.g., a rear upright member 110 and a front upright member 112 that are coupled to the deck portion 108 of the backbone 102 such that the upright members extend vertically (e.g., vertically upward) from the deck portion 108 of the backbone 102. In particular, the front upright member 112 may be coupled to and disposed adjacent one end 140 of the deck portion 108 of the backbone 102, and the rear upright member 110 may be coupled to and disposed adjacent an opposite end of the deck portion 108 that forms a joint with the intermediate portion 104 of the backbone 102. That is, the front upright member 112 and the rear upright member 110 may be coupled to the deck portion 108 of the backbone 102 such that they are spaced apart and substantially parallel to each other.

In one example embodiment, the front and rear upright members (112, 110) of the cargo carrier 100 may be welded to the backbone 102, i.e., the deck portion 108 of the backbone 102, for example. However, in other example embodiments, one or both of the front and rear upright members (112, 110) may be mechanically coupled to the backbone 102 using fasteners. For example, if the front and rear upright members (112, 110) are constructed using non-ferrous material and the backbone 102 is constructed using ferrous material or vice-versa, they cannot be welded. Instead, in said example the front and rear upright members (112, 110) may be coupled to the backbone 102 using appropriate fasteners.

In either case, both the front upright member 112 and the rear upright member 110 may be substantially U-shaped with rounded corners. Each of the front upright member 112 and the rear upright member 110 may include a bottom support portion 319 and two arms 321 that extend substantially perpendicular to the bottom support portion 319 from opposite ends thereof. The arms 321 of the front upright member 112 may be substantially straight. However, as illustrated in FIGS. 1-8, each arm 321 of the rear upright member 110 may include an upper portion 116, a lower portion 114, and an angled intermediate portion 118 that is disposed between the upper portion 116 and the lower portion 114. The angled intermediate portion 118 may be configured to provide a horizontal offset between the upper portion 116 of the arm 321 that is coupled to one end of the angled intermediate portion 118 and a lower portion 114 of the arm 321 that is coupled to an opposite end of the angled intermediate portion 118. That is, the angled intermediate portion 118 of the arm 321 may be configured such that an axis 161 of the upper portion 116 of the arm 321 may be horizontally offset from an axis 163 of the lower portion 114 of the arm 321.

The horizontal offset is designed to: (a) provide a closer fitment of the cargo carrier 100 to the rear end 504 of the vehicle 901 which in turn may minimize any aerodynamic drag created by the cargo carrier 100, (b) improve an aesthetic appearance of the cargo carrier 100, and (b) follow or substantially match a contour of the rear end 504 of the vehicle 901. The horizontal offset also allows the cargo carrier 100 to have a larger upper cargo deck 120, which in turn results in increased cargo carrying space when compared to the lower cargo deck 122. In other words, the horizontal offset allows the cargo carrier 100 to have cargo decks (120, 122) of different sizes.

Even though the present disclosure describes that the arms 321 of the rear upright member 110 of the cargo carrier 100 illustrated in FIGS. 1-8 include an angled intermediate portion 118 that horizontally offsets an upper portion 116 of the arm 321 that is coupled to one end of the angled intermediate portion 118 and a lower portion 114 of the arm 321 that is coupled to an opposite end of the angled intermediate portion 118, one of skill in the art can understand and appreciate that in other example embodiments, the arms of the upright members (e.g., rear upright members 110) of the cargo carrier may not include the angled intermediate portion that horizontally offsets an upper portion of the arm from a bottom portion of the arm. That is, in said other example embodiments, the arms of the rear upright member may be substantially straight like that of the front upright member 112. FIG. 9 illustrates an example cargo carrier 900 with both the upright members (112, 910) having substantially straight arms, i.e., without the angled intermediate portion 118. The example cargo carrier 900 that is illustrated in FIG. 9 may be substantially similar to the example cargo carrier 100 illustrated in FIGS. 1-8 except that in the example cargo carrier 900 of FIG. 9, both the upright members (112, 910) have substantially straight arms as described above and the cargo decks (119, 121) are substantially similar in size. As such the example cargo carrier 900 of FIG. 9 will not be described further in greater detail for the sake of brevity.

In addition to the backbone 102 and the upright members (110, 112), as illustrated in FIGS. 1-8, the cargo carrier 100 of the present disclosure may include cargo decks that are configured to provide the extra cargo space when the cargo carrier 100 is coupled to the vehicle 901. In particular, the cargo carrier 100 of the present disclosure may include an upper cargo deck 119 that is coupled to the arms 321 of the front and rear upright members (112, 110), and a lower cargo deck 121 that is coupled to the bottom support portion 319 of the front and rear upright members (112, 110).

The upper cargo deck 119 may include an angled frame 120, e.g., an L-shaped frame, and a perforated or expanded metal floor 144 that is coupled to and disposed in the angled frame 120 such that the perforated or expanded metal base 144 defines a base of the upper cargo deck 119. The angled frame 120 may include a shoulder 123 that defines a central opening 125 that is substantially rectangular, and a sidewall 127 that extends along a perimeter of the shoulder 123 and is substantially perpendicular to the shoulder 123. Further, the upper cargo deck 119 may include support braces 612 that are coupled to the shoulder 123 such that they extend across the central opening 125 defined by the shoulder 123 to strengthen the angled frame 120 and provide additional support for the perforated or expanded metal floor 144 (hereinafter 'perforated metal floor'). The perforated metal floor 144 may be coupled to the shoulder 123 of the angled frame 120 and/or the support braces 612 thereof. The perforated metal floor 144 may allow water to seep through, thereby minimizing accumulation of moisture (e.g., when raining). Even though the present disclosure describes the metal floor 144 as being perforated or expanded, one of skill in the art can understand and appreciate that in other example embodiments, the floor of the upper cargo deck 119 may be a metal sheet with no perforations without departing from a broader scope of the present disclosure.

Further, the sidewall 127 of the angled frame 120 may be configured to prevent any cargo or load that is disposed on the perforated floor 144 of the upper cargo deck 119 from sliding off the cargo carrier 100. Furthermore, the sidewall 127 may include securement openings 126 that are formed therein to provide easy tie-down points for securing the cargo or load that is disposed on the upper cargo deck 119.

For example, tie-downs such as straps, bungees and nets may be hooked or attached to the sidewall 127 to secure the cargo or load tightly on the upper cargo deck 119. The securement openings 126 may also be configured to minimize the weight of the cargo carrier 100, i.e., they help lighten the cargo carrier 100. In some example embodiments, the support braces 612 may also include lightening holes that are formed therein to reduce the overall weight of the cargo carrier 100.

The lower cargo deck 121 that comprises an angled frame 122 and a perforated metal floor 144 that is disposed therein may be substantially similar to the upper cargo deck 119 except that the lower cargo deck 121 may be smaller than the upper cargo deck 119. Accordingly, the lower cargo deck will not be further described in greater detail for the sake of brevity. Even though the example cargo carrier 100 includes an upper cargo deck 119 that is larger (e.g., floor space) than the lower cargo deck 121, one of skill in the art can understand and appreciate that in other example embodiments, the upper and lower cargo decks (119, 121) of the cargo carrier may be substantially similar in size, e.g., as illustrated in FIG. 9.

As illustrated in FIGS. 1-8, the shoulder 123 of the angled frame 120 of the upper cargo deck 119 may be coupled to (e.g., welded or mechanically coupled) the top ends of the arms 321 of the front and rear upright members (112, 110) at the corners thereof, for example, such that the upper cargo deck 191 is supported on the arms 321 of the front and rear upright members (112, 110). Further, the shoulder 123 of the angled frame 122 of the lower cargo deck 121 may be coupled to (e.g., welded or mechanically coupled) the bottom support portions 319 of the front and rear upright members (112, 110). In particular, as illustrated in FIGS. 1-8, the upper cargo deck 119 and the lower cargo deck 121 may be arranged such that they define a double decker type cargo carrier 100. That is, the upper cargo deck 119 and the lower cargo deck 121 may be coupled to the front and rear upright members (112, 110) such that the upper cargo deck 119 may be spaced apart from and at least partially overlying the lower cargo deck so as to provide a storage cavity or space 124 between the cargo decks (119, 121).

The height 'h' of the storage cavity 124 may be defined by the distance between the upper cargo deck 119 and the lower cargo deck 121, the width 'w' of the storage cavity 124 may be defined by the distance between the arms 321 of each upright member (110, 112), and the depth 'd' of the storage cavity 124 may be defined by distance between the front and rear upright members (112, 110). As such, the size of the storage cavity 124 may be adjusted by adjusting the dimensions of the upright members (110, 112) and the spacing between the cargo decks (119, 121). In some example embodiments, the arms 321 of the upright members (110, 112) of the cargo carrier 100 may be made telescopic such that arms 321 can be extended or collapsed to adjust the height between the upper and lower cargo decks (119, 121) as needed.

Figure 8:
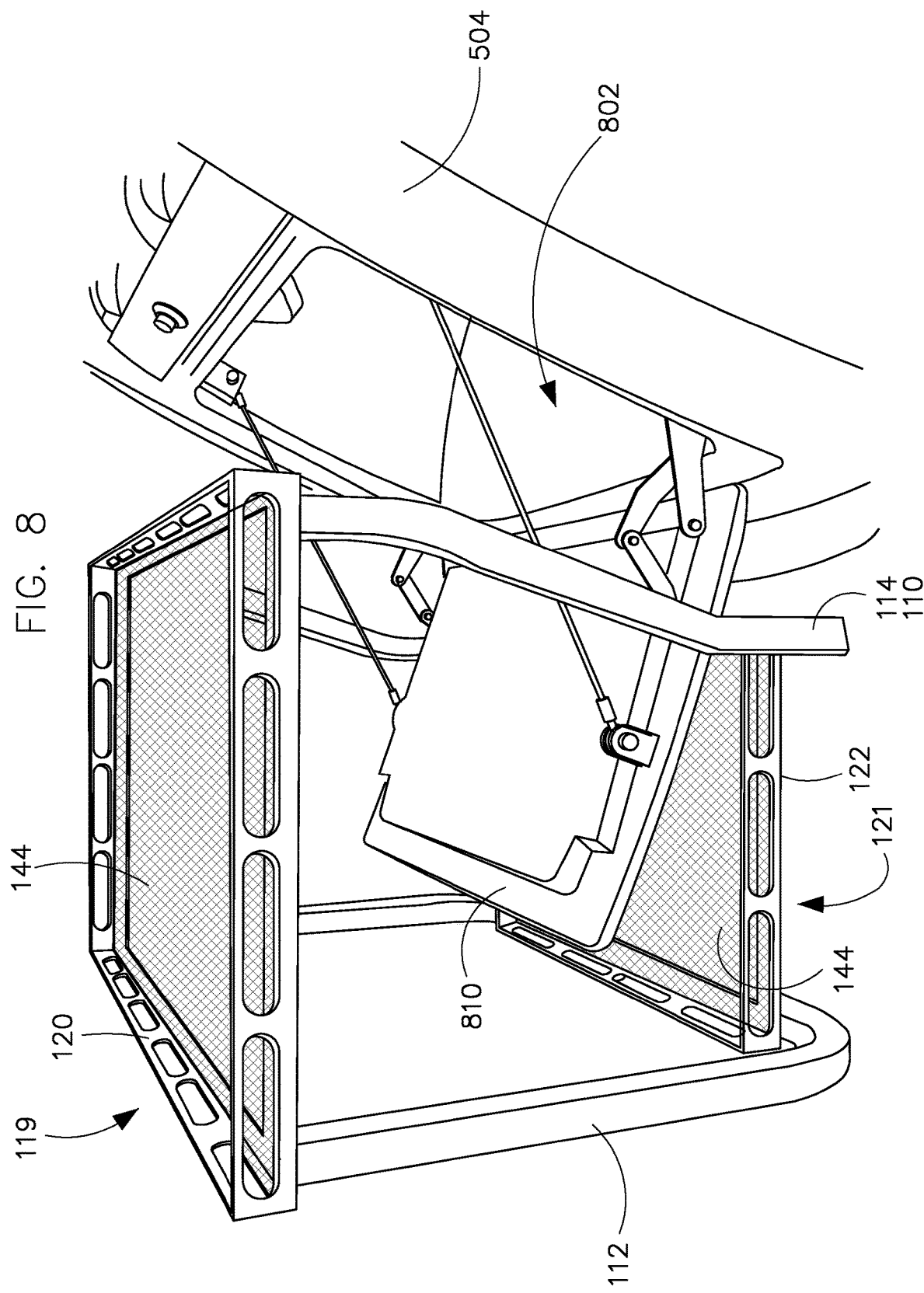
FIG. 8 illustrates a perspective view of the example hitch mounted double deck cargo carrier of FIG. 1 coupled to a vehicle with the trunk of the vehicle being open while the hitch mounted double deck cargo carrier is coupled to the vehicle, in accordance with example embodiments of the present disclosure.

The storage cavity 124 may be configured to receive any appropriate cargo, such as a cooler, luggage bag, camping equipment, etc., that is disposed in the lower cargo deck 121. Further, as illustrated in FIG. 8, the storage cavity 124 may be configured to receive the rear door 810 of the vehicle 901 that provides access to the cargo space 802 when the rear door 810 is opened. The rear door 810 may be received into the storage cavity 124 through an opening 302 in between the arms 321 of the rear upright member 110. That is, the cargo carrier 100 of the present disclosure does not block or hinder the opening of the rear door 810 of the vehicle 901 when the cargo carrier 100 is attached to the vehicle 901. So, unlike conventional cargo carriers that need to be fully detached from the vehicle 901 and set aside when the rear door 810 of the vehicle 901 is to be opened to access the cargo space 802 in the vehicle 901, the cargo carrier 100 of the present disclosure is configured such that it can remain attached to the vehicle while still allowing the rear door 810 of the vehicle 901 to be opened to access the cargo space 802 in the vehicle 901. Accordingly, one of the unique features of the cargo carrier 100 of the present disclosure is that the cargo carrier 100 provides multiple cargo decks (119, 121) that translates to increased cargo space while keeping a compact footprint with the double deck design and without blocking or hindering access to the cargo space 802 (e.g., trunk) at the rear end 504 of the vehicle 901 when the cargo carrier 100 is coupled at the rear end 504 of the vehicle 901.

Figure 3:
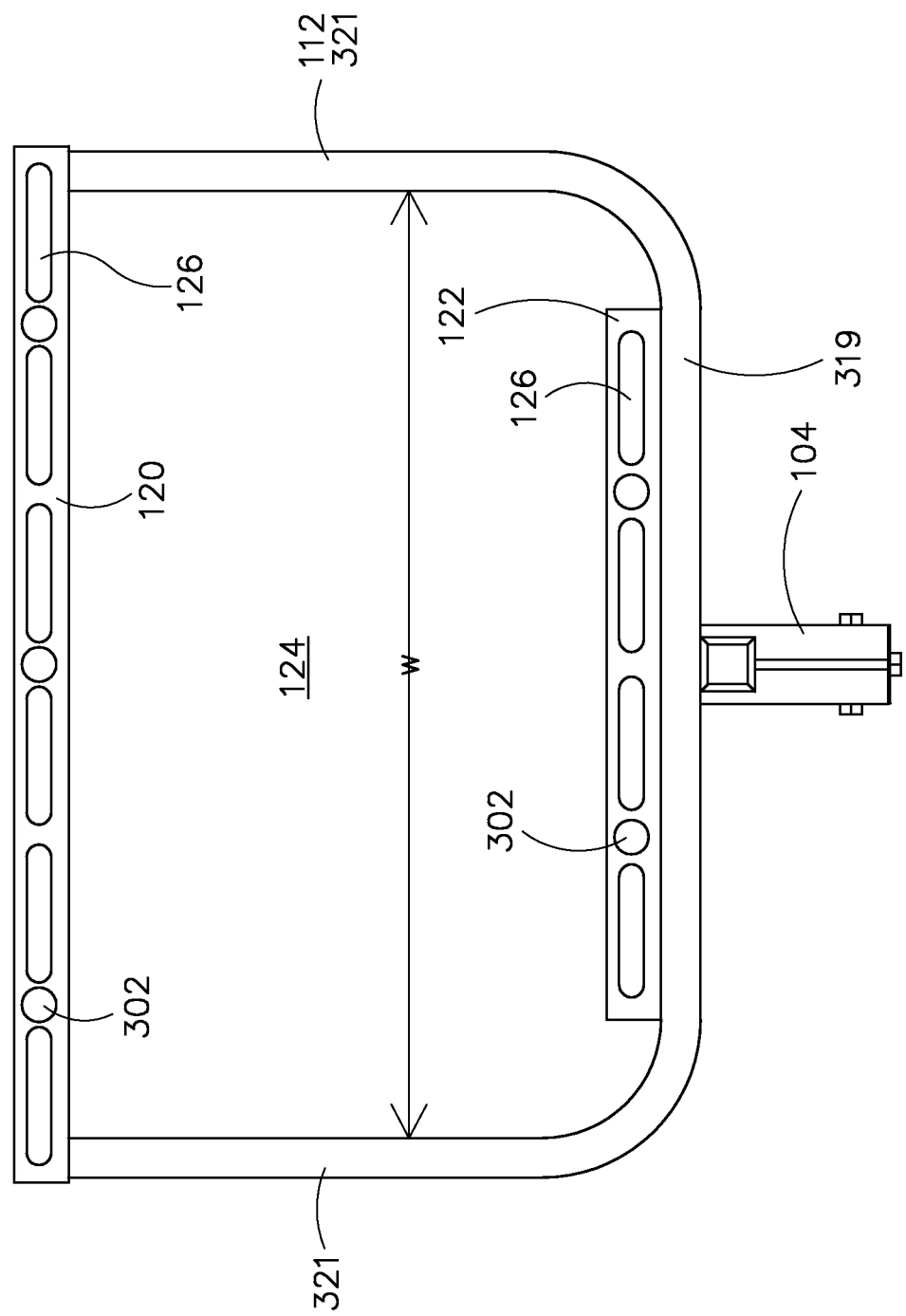
FIG. 3 illustrates a front view of the example hitch mounted double deck cargo carrier of FIG. 1, in accordance with example embodiments of the present disclosure.
Figure 6:
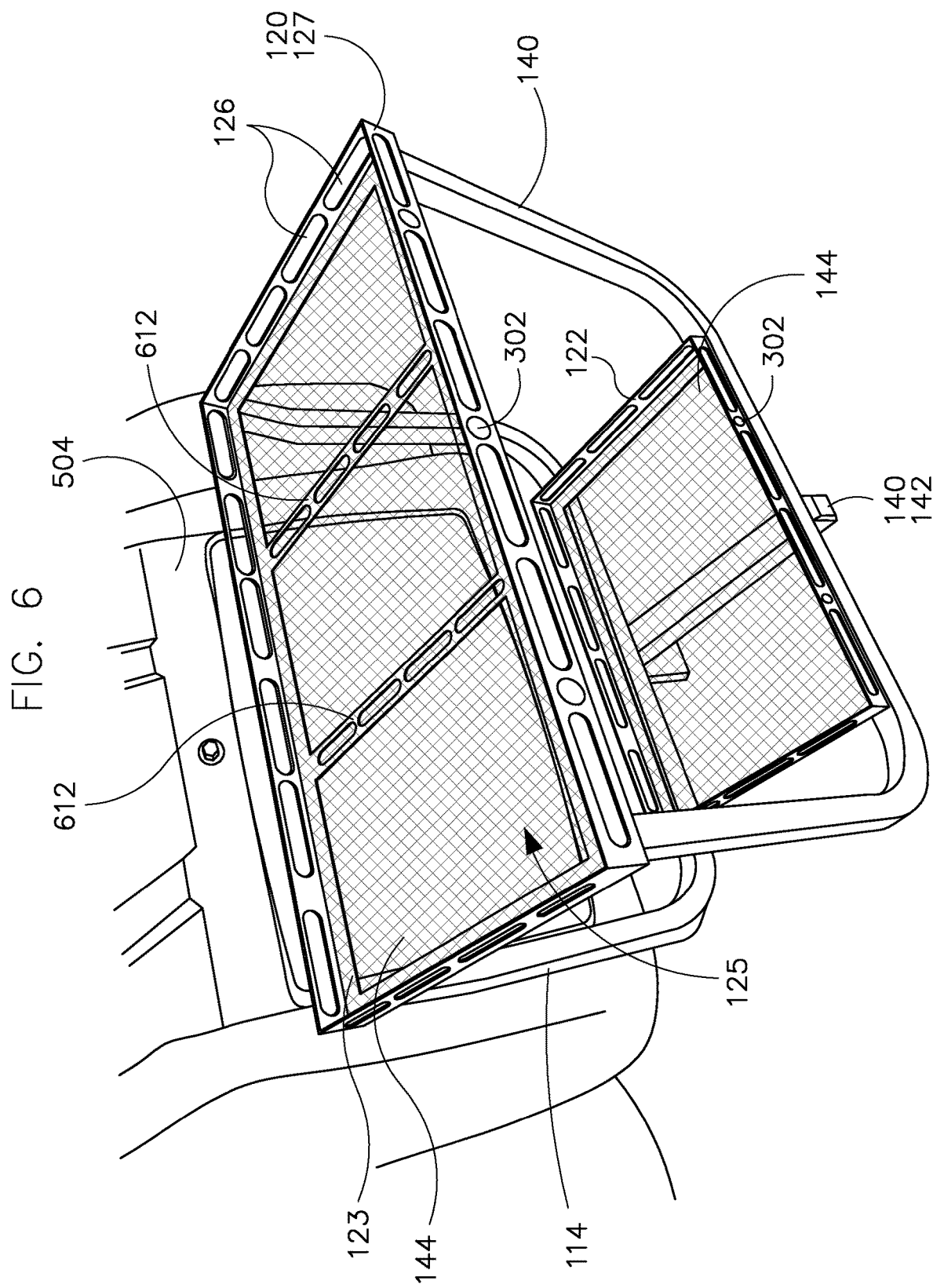
FIG. 6 illustrates a perspective view of the example hitch mounted double deck cargo carrier of FIG. 1 coupled to a vehicle via the trailer hitch receiver, in accordance with example embodiments of the present disclosure.

Additionally, as illustrated in FIGS. 1, 3, and 6, the cargo carrier 100 may include reflectors 302 that are formed into or coupled to the sidewalls 127 of the angled frames 120, 122 of the upper and lower cargo decks (119, 120) such that they form a reflector pattern. In the example embodiment illustrated in FIGS. 1-8, the reflectors 302 may be arranged such that they form an inverted triangle pattern along with the reflector on the end cap 142 of the backbone 102. The reflectors 302 may be configured to increase the visibility of the cargo carrier 100, especially during the nighttime.

Even though the present disclosure illustrates the cargo carrier 100 as being coupled to a tricycle motorcycle 901, one of skill in the art can understand and appreciate that in other example embodiments, the cargo carrier 100 may be used with any other appropriate vehicle without departing from a broader scope of the present disclosure. For example, the cargo carrier 100 may be configured for use with sedans, SUVs, etc.

Although example embodiments are described herein, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A cargo carrier configured to be mounted to a trailer hitch receiver of a vehicle to position said cargo carrier proximate to a rear end of the vehicle, the cargo carrier comprising:
   a backbone member that comprises a hitch mounting portion and a deck portion that are vertically offset from each other, the hitch mounting portion configured to be removably coupled to the trailer hitch receiver;
   an upright member assembly comprising:
      a front upright member that is coupled to and disposed adjacent a first end of the deck portion of the backbone member; and
      a rear upright member that is coupled to and disposed adjacent a second end of the deck portion of the backbone member;
   an upper cargo deck and a lower cargo deck that are coupled to the upright member assembly such that the upper cargo deck is spaced apart from and at least partially overlying the lower cargo deck, wherein the upper cargo deck and the lower cargo deck define a storage cavity therebetween.

2. The cargo carrier of claim 1, wherein the storage cavity is configured to receive a rear door of the vehicle therein when the cargo carrier is mounted to the vehicle and when the rear door is opened and pivots outward from the rear end of the vehicle, and wherein the rear door of the vehicle when pivoted outward extends into the storage cavity through an opening defined by the rear upright member of the upright member assembly which is disposed adjacent the rear end of the vehicle.

3. The cargo carrier of claim 1, wherein each of the front upright member and the rear upright member comprises:
   a planar bottom support portion; and
   two arms that extend substantially perpendicular to the bottom support portion from opposite ends thereof such that an opening is defined between the two arms.

4. The cargo carrier of claim 3, wherein each of the two arms of the rear upright member comprises:
   a lower portion that extends from the bottom support portion;
   an upper portion; and
   an angled intermediate portion that is disposed in between the upper portion and the lower portion such that the angled intermediate portion horizontally offsets the upper portion from the lower portion.

5. The cargo carrier of claim 3, wherein the lower cargo deck is coupled to the bottom support portion of both the front upright member and the rear upright member; and wherein the upper cargo deck is coupled to upper ends of the two arms of the front upright member and the rear upright member.

6. The cargo carrier of claim 1, wherein the backbone member further comprises an intermediate portion that is disposed between the hitch mounting portion and the deck portion, the intermediate portion being configured to vertically offset the hitch mounting portion from the deck portion.

7. The cargo carrier of claim 6, wherein the backbone member comprises a first gusset plate that is coupled to and disposed between the deck portion and the intermediate portion and a second gusset plate that is coupled to and disposed between the hitch mounting portion and the intermediate portion, and wherein the first gusset plate, the second gusset plate, and the hitch mounting portion of the backbone member include lightening holes formed therein.

8. The cargo carrier of claim 1, wherein the backbone member further comprises a support collar that is coupled to the hitch mounting portion of the backbone member and configured to secure the hitch mounting portion of the backbone member and the trailer hitch receiver, wherein the support collar is configured to receive the trailer hitch receiver between the backbone member and the support collar.

9. The cargo carrier of claim 8, wherein the support collar comprises collar apertures that are configured to receive fasteners therethrough to secure the hitch mounting portion of the backbone member to the trailer hitch receiver when the support collar receives the trailer hitch receiver between the backbone member and the support collar.

10. The cargo carrier of claim 1, wherein each of the upper cargo deck and the lower cargo deck comprises:
    an angled frame; and
    a perforated floor that is coupled to and disposed in the angled frame.

11. The cargo carrier of claim 10, wherein the angled frame comprises a shoulder that defines a central opening and a sidewall that extends substantially perpendicular to the shoulder along an outer perimeter of the shoulder, and wherein the perforated floor is coupled to the shoulder of the angled frame.

12. A cargo carrier configured to be mounted to a trailer hitch receiver of a vehicle to position said cargo carrier proximate to a rear end of the vehicle, the cargo carrier comprising:
    a backbone member that comprises a first end that is configured to be removably coupled to a trailer hitch receiver of a vehicle and a second end, wherein the first end is vertically offset from the second end;
    a support collar that is coupled to and disposed adjacent the first end of the backbone member, wherein the support collar is configured to receive a portion of the trailer hitch receiver between the first end of the backbone member and the support collar and secure the backbone member to the trailer hitch receiver;
    a first upright member and a second upright member that are coupled to and disposed adjacent a second end of the backbone member such that the first upright member is substantially parallel to and spaced apart from the second upright member; and
    an upper cargo deck and a lower cargo deck that are coupled to the first upright member and the second upright member such that the upper cargo deck is spaced apart from and at least partially overlying the lower cargo deck,
       wherein the upper cargo deck and the lower cargo deck define a storage cavity therebetween that is configured to receive a rear door of the vehicle therein when the cargo carrier is mounted to the vehicle and when the rear door is opened and pivots outward from the rear end of the vehicle such that the rear door extends into the storage cavity.

13. The cargo carrier of claim 12, wherein the upper cargo deck is larger than the lower cargo deck.

14. The cargo carrier of claim 12, wherein the upper cargo deck and the lower cargo deck are substantially similar in size.

15. The cargo carrier of claim 12, wherein each of the first upright member and the second upright member comprises:
    a planar bottom support portion; and
    two arms that extend substantially perpendicular to the bottom support portion from opposite ends thereof such that an opening is defined between the two arms.

16. The cargo carrier of claim 15, wherein each of the two arms of one of the first upright member and the second upright member comprises:
    a lower portion that extends from the bottom support portion;
    an upper portion; and
    an angled intermediate portion that is disposed in between the upper portion and the lower portion such that the angled intermediate portion horizontally offsets the upper portion from the lower portion.

17. The cargo carrier of claim 12, wherein the support collar is coupled to the backbone member such that the backbone member extends through the support collar, and wherein the support collar comprises a plurality of collar apertures that are configured to receive fasteners therethrough to secure the removable coupling between the backbone member and the trailer hitch receiver.

18. The cargo carrier of claim 12, wherein each of the upper cargo deck and the lower cargo deck comprises:
    an angled frame; and a perforated floor that is coupled to and disposed in the angled frame.

19. The cargo carrier of claim 18, wherein the angled frame comprises a shoulder that defines a central opening and a sidewall that extends substantially perpendicular to the shoulder along an outer perimeter of the shoulder, and wherein the perforated floor is coupled to the shoulder of the angled frame.

20. The cargo carrier of claim 19, wherein the sidewall of each of the upper cargo deck and the lower cargo deck comprises securement openings that are formed therein to provide tie-down points for securing cargo that is disposed in the upper cargo deck and the lower cargo deck, respectively, and wherein the sidewall comprises reflectors that are coupled thereto.

* * * * *